F. P. POOLE.
INDEXING CARRIER.
APPLICATION FILED JULY 20, 1917.
1,258,808.
Patented Mar. 12, 1918.
3 SHEETS—SHEET 3.
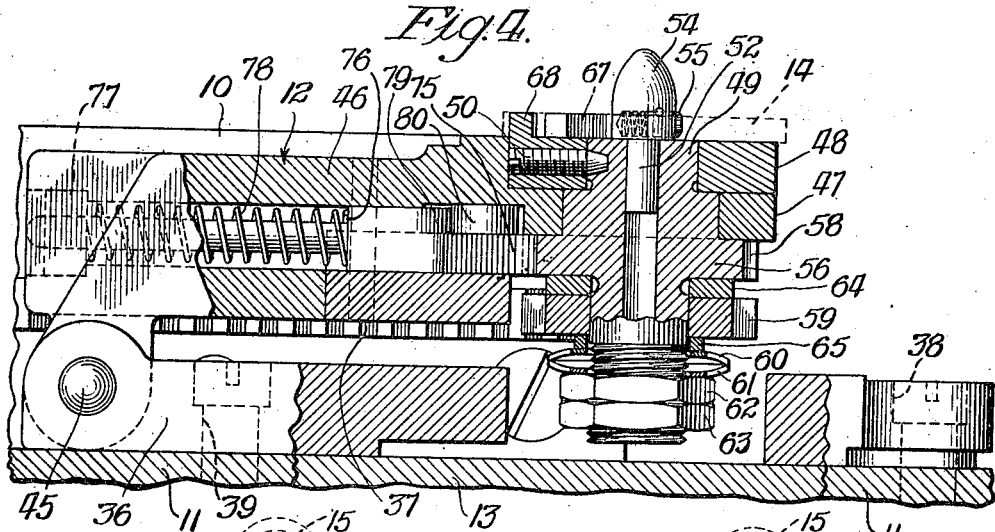
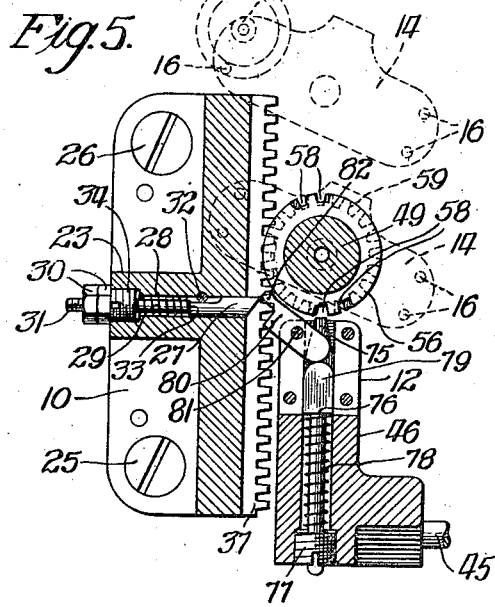
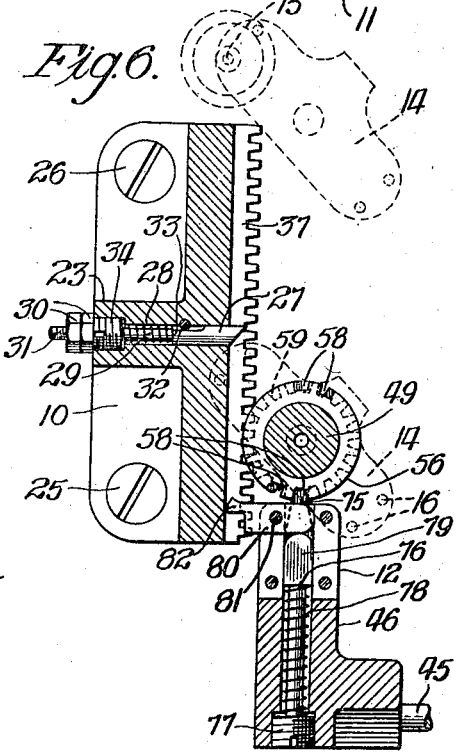
Inventor
Frederick P. Poole
by J. G. Roberts
Atty.

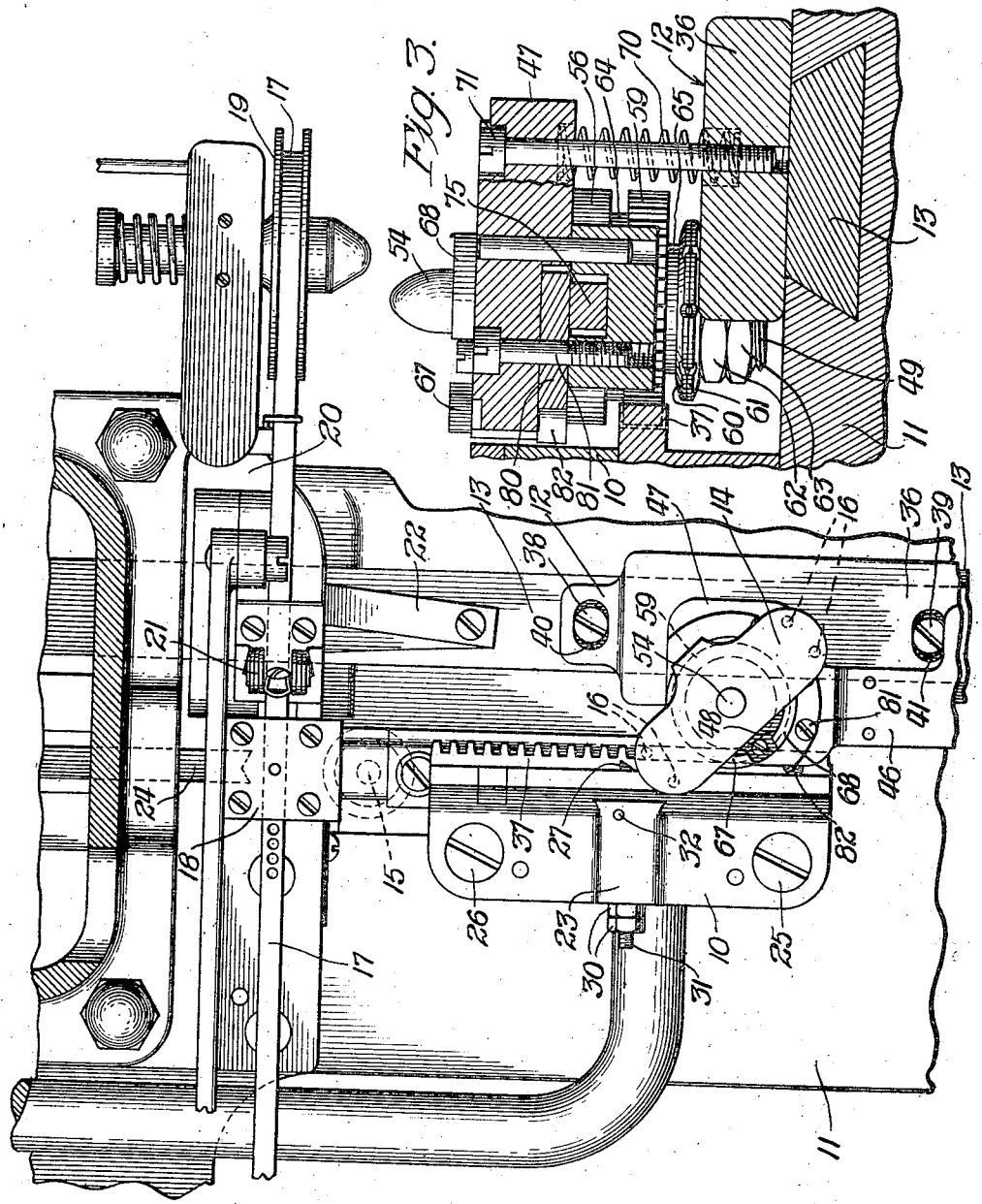

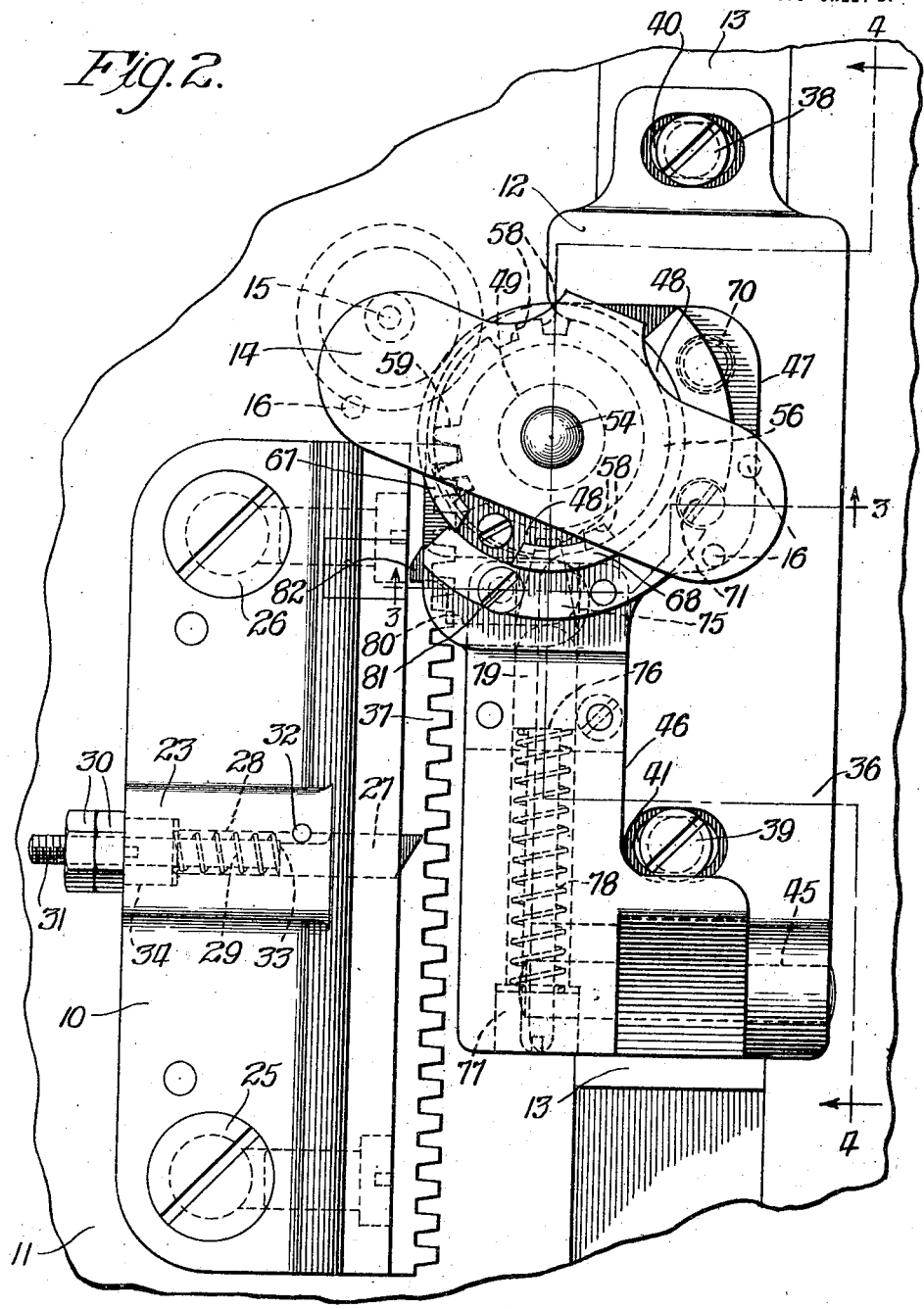

UNITED STATES PATENT OFFICE.

FREDERICK P. POOLE, OF LA GRANGE, ILLINOIS, ASSIGNOR TO WESTERN ELECTRIC COMPANY, INCORPORATED, OF NEW YORK, N. Y., A CORPORATION OF NEW YORK.

INDEXING-CARRIER.

1,258,808.

Specification of Letters Patent. Patented Mar. 12, 1918.

Application filed July 20, 1917. Serial No. 181,828.

*To all whom it may concern:*

Be it known that I, FREDERICK P. POOLE, a citizen of the United States, residing at La Grange, in the county of Cook and State of Illinois, have invented certain new and useful Improvements in Indexing-Carriers, of which the following is a full, clear, concise, and exact description.

This invention relates to an indexing carrier, and more particularly to an indexing mechanism capable of indexing through successive positions of variable separation.

One of the objects of this invention, therefore, consists in an improved indexing mechanism which will index through successive angles of varying degrees.

Another object consists in an improved and simplified form of indexing mechanism rigidly constructed and arranged to automatically index through successive positions of variable separation.

Other objects of the invention will become apparent from the following description and the appended claims.

The invention is illustrated in the accompanying drawings, in which:

Figure 1 is a fragmentary plan view of an electro welding machine with the indexing carrier placed in position thereon;

Fig. 2 is a plan view of the indexing carrier;

Fig. 3 is a vertical section on the plane 3—3 of Fig. 2 looking in the direction of the arrows;

Fig. 4 is a vertical section on the plane 4—4 of Fig. 2 looking in the direction of the arrows;

Fig. 5 is a plan view of the indexing carrier partly in section showing the releasing pawl withdrawn for turning the indexing mechanism into its next position; and Fig. 6 is a similar view with the releasing pawl in its normal position and the indexing carrier rotated to its first position.

In the preferred embodiment of the invention, as illustrated in Fig. 1, the indexing carrier is used in combination with the electro welding machine illustrated and described in United States Patent No. 1,090,618 to W. F. Hosford, issued March 17, 1914. The invention is not limited to use with this machine, however, and may be used with any machine equipped with a reciprocating movement and in which it is desired to index through successive angles of varying degrees.

The indexing carrier is constructed in two parts—a stationary part 10 rigidly secured to the bed plate 11 of the machine, and the reciprocating part 12 secured to a reciprocating slide 13 of the machine. The part 12 carries the article 14 which is to be indexed and operated upon, and as said part reciprocates to and fro with the slide 13, the part 14 is moved in its proper position to the point of weld 15 of the machine. The preferred operation on the article 14, as herein illustrated and described, consists in welding four metallic disks such as 16 on said article. These metallic disks are cut from a sheet metal ribbon 17 by a die 18 and a punch (not shown), the ribbon being carried on a supply reel 19 which is advanced through the machine by means of a reciprocating carrier bed 20 and a knurled steel roller reciprocated by the spring 21. The reciprocating carriage 20 is controlled by the cam 22 secured to the reciprocating slide 13. When a metallic disk 16 is punched out of the ribbon 17, it is advanced forward by the transfer slide 24 which is equipped with a V-shaped notch in its front end, which moves the disk 16 to the point of weld 15 on the article 14, at which time the electrode plunger is lowered and the disk welded to the article 14.

The foregoing very brief description of the operating parts of the welding machine will permit of a satisfactory description of the operation of the indexing carrier with said machine, a more detailed description of the means for operating and moving the various parts referred to being disclosed in the hereinbefore mentioned Hosford patent.

The stationary part of the indexing carrier 10 is secured to the bed plate 11 by means of the screws 25 and 26. It is fitted with a spring pressed pawl 27 adjustably mounted in a cylindrical perforation 28 in the rectangular shoulder 23 centrally situated on the part 10. The pawl is adjustably mounted by means of the spring 29 and the nuts 30 secured to a threaded portion 31 attached to the rear end of said pawl. A stop pin 32 controls the movement of said pawl in the rearward direction, and the adjusting nuts 30 control the movement of the pawl in the forward direction. The spring 29 which controls the movement of the pawl 27 is held in position between the inner face of a screw 34 fitted into an enlargement in the cylindrical opening of the upright 23 and the shoulder 33 of the pawl 27. Secured and extending along the entire length of the inner face of the stationary part 10 below the protruding portion of the pawl 27 is a rack 37.

The reciprocating part of the carrier 12 comprises a mounting base 36 which is secured to the slide 13 by means of the screws 38 and 39 which extend through the oval perforations 40 and 41 in the plate 36 whereby lateral adjustment of the plate 36, and consequently the movable portion of the carrier 12 with respect to the slide 13, may be obtained. Pivotally mounted to the plate 36 by means of the pin 45 is the forwardly extending rectangular part 46, the forward end of which is fitted with a projecting portion 47 which is cut out to receive the annular mounting disk 48, on which the article 14 to be operated on is mounted. The forward portion 47 of the pivotally mounted member 46 is fitted with a circular opening, the center of which is in alinement with the center of the annular mounting plate 48 and in which opening is rotatably mounted the cylindrical part 49.

The annular mounting plate 48 is secured to the upper portion of the cylindrical part 49 by means of set screws such as 50, the annular mounting plate 48 thereby being rigidly secured to the part 49, the lower face thereof riding on the upper surface of the part 47 and thereby holding the cylindrical part 49 and its associated mechanism in place. The upper face of the cylindrical part 49 is drilled to receive the pin 52, integral with which is the conically shaped mounting pin 54. The mounting pin 54 is fitted with the spring pressed holding pin 55. The cylindrical member 49 is fitted with an enlarged cylindrical portion 56 directly beneath the part 47, said part being fitted with a plurality of notches such as 58. Directly below the notched disk 56 the cylindrical part 49 is reduced in diameter, on which reduced portion is loosely mounted the spur gear 59 and the spring washers 60 and 61. The extreme end of the part 49 is threaded to receive the nuts 62 and 63. Mounted above and below the spur gear 59 on the reduced cylindrical portion of the part 49 are the friction washers 64 and 65 respectively which are constructed preferably of fiber.

As will be evident from the foregoing description, the cylindrical member 49 is free to rotate in the circular opening in the part 47, said cylindrical part 49 being held in position by the mounting washer 48. The spur gear 59 is connected to the part 49 by the friction exerted through the friction washers 64 and 65 because of the pressure exerted by the spring washers 60 and 61. Consequently when the spur gear is turned, it will turn with it the part 49 and its associated mechanism, unless some external force is exerted on the part 49 which will overcome the friction exerted by means of the friction washers 64 and 65 and the spring washers 60 and 61. Whenever such a force is exerted the spur gear 59 will rotate about the part 49, the part 49 remaining stationary.

Integral with the mounting disk 48 are the holding lugs 67 and 68 which, together with the mounting pin 54, hold the article 14 to be operated on in the position desired. The rectangular, forwardly projecting, pivotally mounted arm 46 is held in normal position by means of the spiral spring 70, and said part is limited in its upward movement by means of the screw 71 which is fitted in the base 36 and whereby the relative position of the part 46 with respect to the part 36 can be readily adjusted. The part 46 is pivotally mounted for the purpose of giving a slight vertical movement to the article holding carrier, by means of which the article 14, the disk 16, and the two electrodes are all properly alined for the welding operation.

The forwardly extending arm 46 is cored out to receive a pawl 75 which is mounted in alinement with and coöperates with the notches in the notched disk 56. This pawl is fitted with the shoulder 76 between which and the inner shoulder of a nut 77 fitted in the end of the part 46 a pressed spiral spring 78 encircles the reduced cylindrical portion of the pawl which is free to move through a central aperture in the nut 77. The pawl 75 is fitted with a raised semi-circular shoulder 79 with which coöperates the operating dog 80 pivoted at 81 which is semi-circularly formed at one end and fitted with a tapered operating pin 82 at the other end. When the dog 80 is rotated in a clockwise direction about the pivot 81, the semi-circularly formed end thereof will glide over the semi-circular end of the shoulder 79 of the pawl 75, thereby retracting said pawl against the force of the spring 78 and withdrawing the tapered end of the pawl out of one of the notches 58. When the dog 80 is rotated in a counter clockwise direction, it will have no effect upon the operating pawl 75.

Very briefly stated, the general operation of the indexing carrier may now be described as follows:

The stationary part 10 is first rigidly secured to the bed plate of the machine, after which the reciprocating part 12 is adjustably mounted on the slide in such a position that the spur gear 56 will be in mesh with the rack 37. The article 14 to be operated upon is then placed on the mounting disk 48 which is held in position by the mounting pin 54 and mounting lugs 67 and 68.

Obviously the mounting mechanism may be of any character, the design thereof depending upon the article to be operated upon. In the preferred form herein shown and described the article is fitted with a central opening which fits over the pin 54, and said article is operated on in four positions, as indicated by the position of the metallic disk 16 shown on the parts. When the stationary part 10 and reciprocating part 12 have been properly alined on the machine and an article 14 has been placed upon the mounting plate 48, the machine is started and allowed to rotate for four reciprocations of the vertical slide 13, during which period the article 14 will be indexed through four positions and a disk 16 welded in each one of these positions. This indexing of the article is the direct result of the operation of the spur gear 59 coöperating with the rack 37. As the part 12 of the carrier is moved forward, the spur gear 59 is rotated by the teeth of the rack 37; but the part 49 which carries the article carrying disk 48 is not rotated with the spur gear, since this part is held in position by the pawl 75 which rides in one of the notches in the disk 56, and the gear 59 therefore rotates about the reduced cylindrical portion of the part 49 against the friction of the friction washers 64 and 65, said friction being regulated by the spring washers 60 and 61.

As the reciprocating part 12 moves forward, the projecting finger 82 of the dog 80 will strike the protruding end of the pawl 27 and will ride over the inclined surface thereof and force said pawl back against the compression of the spiral spring 29. This will cause a slight movement of the dog 80 in a counter clockwise direction, which will result in the semi-circular end thereof moving in the direction of the notched disk 56. This movement will have no effect upon any of the mechanism contained in the reciprocating part of the carrier. When the slide reaches the end of the forward stroke, the article 14 has been moved to the proper position under the welding electrodes and a metallic disk has been moved forward to the point of weld. At the same time the welding electrode will be forced down and the metallic disk will be welded to the part.

The reciprocating part 12 of the indexing carrier will then start on its return stroke, and in this movement the projecting finger 82 of the dog 80 will strike the protruding edge of the pawl 27, thereby turning the dog 80 about its pivot 81 in a clockwise direction and thus withdrawing the pawl 75 from a notch 58 in the disk 56. As soon as the pawl 75 is withdrawn from its coöperating notch in the disk 56, the rotating spur gear 59 will rotate the cylindrical member 49 and its associated apparatus, the pawl 75 riding on the outer periphery of the disk 56. This rotation of the part 49 will continue as the part 12 is retracted, the spur gear 59 being turned because of its coöperating action with the rack 37.

The spring washers 60 and 61 are so adjusted as to develop a frictional contact between the spur gear 59 and the friction washers 64 and 65, which contact with the part 49 and the spur gear 59, which is greater than the friction produced by the rotating part 49 and the friction generated by the pawl 75 riding on the outer peripheral surface of the notched disk 56. The part 49 will consequently be turned by the gear 59 until the pawl 75 is advanced under the action of the spring 78 into the next successive notch in the disk 56. This rotary movement of the part 49 carries with it the article holding disk 48 and the article mounted thereon, and when the pawl 75 is advanced to the next notch on the disk 56, the article has been turned through an angle so as to properly locate it for the next welding operation. The reciprocating part of the indexing carrier is then again advanced and a second metallic disk 16 is welded on the article 14. In this way in the preferred form of the invention herein illustrated, the machine is operated for four successive reciprocations of the slide 13, following which four metallic disks will be welded on the part 14 in the positions shown thereon. The machine is then stopped and another part put into position on the article holding disk 48 and the above operations are repeated, the indexing carrier being rotated through a definite angle for each reciprocation of the movable part 12, the amount of this rotation depending upon the angular spacing of the notches in the disk 56.

The indexing carrier herein shown and described is arranged for indexing through four successive positions, but it will be quite obvious that the number of these positions can be readily increased or decreased by changing the number of notches fitted in the disk 56. It will also be apparent that since the angle of rotation to which the article is subjected is solely dependent upon the angular displacement of the notches in the disk 56, this rotation being arrested by the insertion of the pawl 75 in one of said notches, the successive angles through which an article is to be indexed may be readily varied by altering the distribution of the notches in the disk.

Although the preferred form of the invention as herein illustrated and described has been shown in combination with a particular form of electro welding machine, it will be evident that with slight variations it may be readily applied to any form of machine which is equipped with a reciprocating member. The invention is likewise not limited to the specific form herein described, but is capable of many variations and other applications without departing from its spirit and scope, as set forth in the following claims.

What is claimed is:

1. An indexing carrier comprising in combination, a stationary member, a reciprocating member, an article carrying member, and means operated by said reciprocating member to automatically index said article carrying member through successive positions of variable separation.

2. An indexing carrier comprising in combination, a stationary member, a reciprocating member, a rotatable indexing member, and means for indexing said rotatable member through successive angles of varying degrees.

3. An indexing carrier comprising in combination, a stationary member, a reciprocating member, a rotatable means carried by said reciprocating member, and means associated with said stationary member coöperating with said rotatable means whereby said rotatable member is indexed through successive angles of varying degrees.

4. In an indexing carrier, in combination, a stationary member, a reciprocating member, rotatable means associated with said reciprocating member, means associated with said stationary member coöperating with said rotatable means, and an index operating mechanism operated by said rotatable means capable of being indexed through successive angles of varying degrees.

5. An indexing carrier comprising in combination, a stationary member, a reciprocating member, a part carrying means associated with said reciprocating member, vertically yielding means for mounting said part carrying means on said reciprocating member, and means coöperating between said stationary and said reciprocating members for indexing said part carrying means through successive positions of variable separation.

6. An indexing carrier comprising in combination, a stationary member, a reciprocating member, a rack associated with said stationary member, a gear wheel mounted on said reciprocating member and coöperating with said rack, an article carrying means, and means for indexing said article carrying means through successive positions of variable separation.

7. In a device of the character described, the combination with a stationary member comprising a rack and a spring operated pawl, of a reciprocating member, a gear associated with said reciprocating member which coöperates with said rack, an article carrying means, a yielding means interconnecting said gear and said article carrying means, a locking means for said article carrying means, and a tripping mechanism operated by said pawl on the return stroke of said reciprocating member to release said locking means and to index said article carrying means through the yielding interconnecting means between said gear and said article carrying means.

8. In a device of the character described, the combination with a stationary member comprising a rack and a spring operated pawl, of a reciprocating member, a gear wheel associated with said member which coöperates with said rack, an article carrying means, yielding means interconnecting said article carrying means and said gear, means to hold said article carrying means in certain fixed positions, and means for releasing said holding means whereby the article carrying means will be indexed into another position through the yielding connection interconnecting said article carrying means and said gear.

9. An indexing carrier comprising in combination, a stationary member, a movable member, an article carrying member, and means operated by said movable member to automatically index said article carrying member through successive positions of variable separation.

In witness whereof, I hereunto subscribe my name this 14th day of May A. D., 1917.

FREDERICK P. POOLE.

Copies of this patent may be obtained for five cents each, by addressing the "Commissioner of Patents, Washington, D. C."